(12) United States Patent
Tomala

(10) Patent No.: US 12,738,694 B2
(45) Date of Patent: Sep. 15, 2026

(54) ELECTRIC CHARGING DEVICE FOR A MOTOR VEHICLE

(71) Applicant: KIEKERT AG, Heiligenhaus (DE)

(72) Inventor: Martin Tomala, Wuppertal (DE)

(73) Assignee: KIEKERT AG, Heiligenhaus (DE)

( * ) Notice: Subject to any disclaimer, the term of this patent is extended or adjusted under 35 U.S.C. 154(b) by 353 days.

(21) Appl. No.: 18/681,954

(22) PCT Filed: Aug. 17, 2022

(86) PCT No.: PCT/DE2022/100609
§ 371 (c)(1),
(2) Date: Feb. 7, 2024

(87) PCT Pub. No.: WO2023/020663
PCT Pub. Date: Feb. 23, 2023

(65) Prior Publication Data

US 2024/0322492 A1 Sep. 26, 2024

(30) Foreign Application Priority Data

Aug. 19, 2021 (DE) ..................... 10 2021 121 545.5

(51) Int. Cl.
*H01R 13/639* (2006.01)
*B60L 53/16* (2019.01)
(Continued)

(52) U.S. Cl.
CPC ............ *H01R 13/639* (2013.01); *B60L 53/16* (2019.02); *E05B 81/06* (2013.01); *E05B 81/18* (2013.01);
(Continued)

(58) Field of Classification Search
CPC . H01R 13/639; H01R 13/447; H01R 2201/26
See application file for complete search history.

(56) References Cited

U.S. PATENT DOCUMENTS 5,458,496 A * 10/1995 Itou ......................... H02J 7/751
439/348
5,934,918 A * 8/1999 Wuechner .......... H01R 13/6395
439/144
(Continued)

FOREIGN PATENT DOCUMENTS

DE 19642687 A1 4/1998
DE 102007002025 A1 7/2008
(Continued)

OTHER PUBLICATIONS

International Search Report mailed Nov. 10, 2022, for priority International Application No. PCT/DE2022/100609.

*Primary Examiner* — Harshad C Patel
(74) *Attorney, Agent, or Firm* — Renner, Otto, Boisselle & Sklar, LLP

(57) ABSTRACT

An electric charging device for a motor vehicle, in particular an electric or hybrid motor vehicle, which is equipped with a charging socket for a charging plug, which is connectable thereto, and with a locking drive for a locking element. On the basis of an action upon the locking drive, the locking element is configured either for releasably locking the charging plug in relation to the charging socket or for acting upon a further element. According to the invention, the further element is in the form of a charging flap covering the charging socket.

17 Claims, 1 Drawing Sheet

(51) Int. Cl.

| | |
|---|---|
| ***E05B 81/06*** | (2014.01) |
| ***E05B 81/18*** | (2014.01) |
| ***E05B 83/28*** | (2014.01) |
| ***H01R 13/447*** | (2006.01) |

(52) U.S. Cl.

CPC ........... *E05B 83/28* (2013.01); *H01R 13/447* (2013.01); *H01R 2201/26* (2013.01)

(56) References Cited

U.S. PATENT DOCUMENTS

| | | | | |
|---|---|---|---|---|
| 8,454,375 | B2 * | 6/2013 | Bauer | B60L 53/16 439/135 |
| 8,550,833 | B2 * | 10/2013 | Martin | H01R 13/6397 439/372 |
| 8,690,591 | B2 * | 4/2014 | Charnesky | B60L 53/16 439/153 |
| 8,951,060 | B2 * | 2/2015 | Meyer-Ebeling | H01R 13/639 320/109 |
| 10,328,809 | B2 * | 6/2019 | Masuda | B60L 53/65 |
| 10,557,298 | B2 * | 2/2020 | Dillinger | B60Q 1/543 |
| 11,325,487 | B2 * | 5/2022 | Djedovic | B60L 53/16 |
| 11,485,243 | B2 * | 11/2022 | Kojima | B60L 53/16 |
| 2012/0071017 | A1 * | 3/2012 | Gaul | H01R 24/28 439/304 |
| 2013/0271079 | A1 * | 10/2013 | Tanneberger | B60L 53/16 320/109 |
| 2016/0368391 | A1 * | 12/2016 | Kojima | B60L 53/16 |
| 2018/0065495 | A1 * | 3/2018 | Masuda | H01R 13/641 |

FOREIGN PATENT DOCUMENTS

| | | | |
|---|---|---|---|
| DE | 102010029446 | A1 | 12/2011 |
| DE | 102011001436 | B3 | 7/2012 |
| DE | 102015118665 | A1 | 12/2016 |
| DE | 102015117509 | A1 | 4/2017 |
| DE | 102018210050 | A1 | 12/2019 |
| EP | 2492134 | A2 | 8/2012 |
| EP | 2865559 | A2 | 4/2015 |
| JP | 5926173 | B2 | 5/2016 |

* cited by examiner

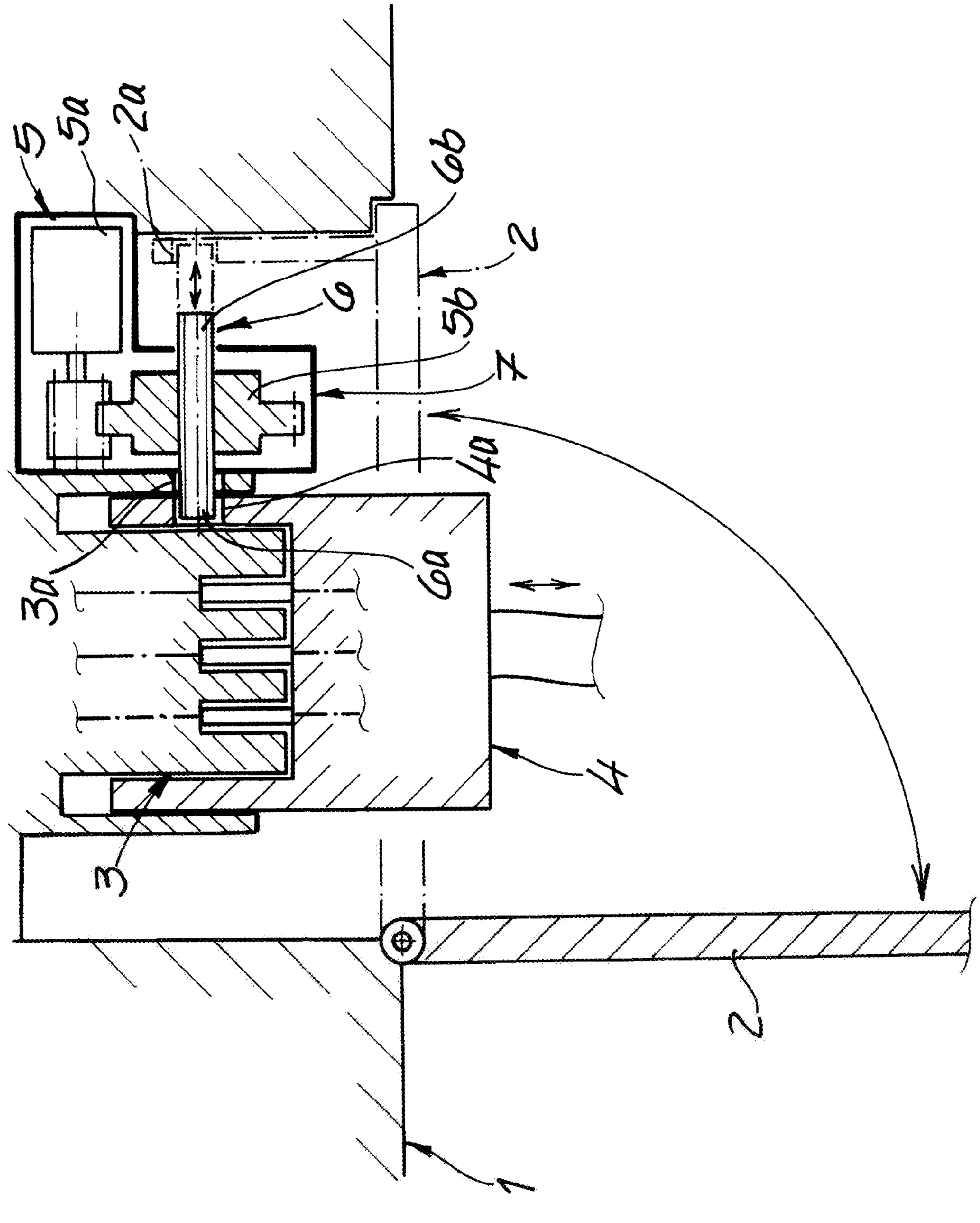
5
5a
2a
6b
2
6
5b
7
4a
3a
6a
4
3
2
1

ELECTRIC CHARGING DEVICE FOR A MOTOR VEHICLE

This application is a national phase of International Patent Application No. PCT/DE2022/100609 filed Aug. 17, 2022, which claims priority to Germany Patent Application No. 10 2021 121 545.5 filed Aug. 19, 2021, each of which is hereby incorporated herein by reference in its entirety.

FIELD OF DISCLOSURE

The invention relates to an electric charging device for a motor vehicle, in particular an electric or hybrid motor vehicle, having a charging socket for a charging plug, which is connectable thereto, and having a locking drive for a locking element, wherein, on the basis of an action upon the locking drive, the locking element is configured either for releasably locking the charging plug in relation to the charging socket or for acting upon a further element.

BACKGROUND OF DISCLOSURE

Electric charging devices in motor vehicles are used in and in conjunction with electric or hybrid motor vehicles. With their aid, vehicle-mounted batteries can typically be supplied with the required electrical charge using a stationary charging infrastructure. For this purpose, the motor vehicle generally has a charging socket and the charging infrastructure is equipped with an associated charging plug. In order to carry out the charging process and to prevent unintentional removal of the charging plug from the charging socket, the charging plug is locked in the charging socket.

The locking thereby substantially fulfills two functions. First, it ensures that only a user who has previously identified themselves at a charging station is authorized to withdraw the chargeable electrical energy and incorrect use is excluded. In addition, the locking ensures that there are no health risks to users, especially since high voltages of several 100 V are often used at this point. Accordingly, locking the charging plug of the charging infrastructure in the charging socket of the motor vehicle is of particular importance. In principle, however, the reverse approach may also be used. In this case, the charging infrastructure is equipped with the charging socket, whereas the charging plug is located on the vehicle side.

The prior art according to DE 10 2018 210 050 A1 relates to a charging system for a motor vehicle drivable by an electric motor. The locking device provided at this point has a controllable actuator. The actuator has a closing element that can be moved transversely into a recess and is designed in the form of a pin.

In the context of DE 10 2015 117 509 A1, the possibility of blocking a charging flap or a cover part by means of a locking element is described. In other words, this generally concerns the possibility of locking the cover of the charging flap.

The generic prior art according to DE 10 2011 001 436 B3 addresses a safety device for an electrical plug connection. Collectively, an actuator and a locking pin are used. With the aid of the locking pin, it is possible to move it into a locking position or a release position by means of the actuator. In the release position, the locking pin alternatively keeps an electrical switch closed as a further element.

In principle, the prior art is proven and tested when it comes to generally locking charging plugs in charging sockets or also ensuring that a charging flap covering the charging socket is locked. It has also proven to be useful in this context if the charging plug or a switch is optionally acted upon by the locking element in the generic prior art.

The locking of the loading flap and that of the charging plug are usually carried out separately from one another, provided that an additional locking of the charging flap is provided at all. This leads to considerable design effort and increased costs. The invention as a whole seeks to remedy this.

SUMMARY OF DISCLOSURE

The invention is based on the technical object of further developing an electric charging device for a motor vehicle such that the design effort is reduced and minimized manufacturing costs are observed.

In order to achieve this technical object, an electric charging device for a motor vehicle is characterized in the context of the invention in that the further element, which is additionally acted upon with the aid of the locking element, is in the form of a charging flap covering the charging socket.

According to an advantageous embodiment, the charging flap can either be locked/unlocked by means of the locking element. If the locking element does not ensure the locking of the charging flap, the locking element is inserted and used for releasably locking the charging plug in relation to the charging socket. This generally takes place in the sense of an exclusive-OR operation.

This means that the locking element either ensures that the charging plug is locked in relation to the charging socket, or the charging flap is locked by means of the locking element. According to the invention, these two alternative approaches can be easily realized and implemented using a single locking element. If the charging plug is locked in relation to the charging socket by means of the locking element, the charging flap is open and does not require any locking. Conversely, the closed position of the charging flap corresponds to the charging plug being pulled out of the charging socket. In this case, the locking element can therefore be used alone to lock the charging flap as part of the alternative approach. Either way, the design effort and expense can be minimized because ultimately only a single locking drive is used for both the charging plug and the charging flap and, moreover, only a single locking element can perform the different functions as described using the locking drive. These are the main advantages.

In order to be able to realize and implement a particularly advantageous application of the locking element, it has proven useful if the locking drive is designed as a linear drive for the locking element. Such a linear drive is recommended because it can advantageously be designed such that the locking element passes through the locking drive on both sides. The linear drive is generally a spindle/spindle nut drive. This advantageously has a drive wheel through which the spindle passes.

That is, rotational movements of the drive wheel are transmitted to the spindle passing through the drive wheel, which as a result carries out the desired linear movement. The locking element can be connected to the spindle or coincides therewith. The drive wheel is in turn generally acted upon directly or indirectly by means of an electric motor. Since the spindle passing through the drive wheel can therefore carry out the desired linear movement, namely in both required directions, the locking element is generally connected to the spindle. There is even the possibility that the spindle and the locking element functionally coincide.

The locking element is generally a locking pin. The locking pin is designed such that its plug-side end is configured for engaging in a recess of the charging plug plugged into the charging socket. In contrast, the other, opposite flap-side end of the locking pin is configured for engaging in a recess of the charging flap. Depending on the rotational movements of the drive wheel, the spindle and with it the locking element or the locking pin can be extended either to one side or to the other side in relation to a housing accommodating the locking drive. This allows the locking pin to engage with its plug-side end in the recess of the charging plug plugged into the charging socket.

If, on the other hand, the locking pin is retracted, this corresponds to a movement of the opposite flap-side end out of the housing of the locking drive and consequently the flap-side end of the locking pin can engage in the recess of the charging flap. This recess of the charging flap can be a latching lug connected in or to the charging flap. Of course, other types of locking are also conceivable and are covered by the invention.

As a result, an electric charging device for a motor vehicle is provided which has a strikingly simple design. At this point, a single locking drive is implemented in conjunction with a single locking element, with the locking drive including the locking element being used to lock both the charging plug plugged into the charging socket and the charging flap in relation to the body of the motor vehicle. Ultimately, this can be attributed to the fact that it is advantageous to use a linear drive as a locking drive at this point. These are the main advantages.

BRIEF DESCRIPTION OF DRAWINGS

In the following, the invention is explained in more detail with the aid of a drawing showing only an exemplary embodiment; in the FIGURES:

FIG. 1 shows a schematic overview of the electric charging device according to the invention for a motor vehicle.

DETAILED DESCRIPTION

FIG. 1 shows an electric charging device for a motor vehicle. All that can be seen from the motor vehicle in FIG. 1 is a body 1 and a charging flap 2 which is rotatably hinged about an axis to the body 1. A charging socket 3 provided and shown in the region of the outer shell of the body 1 is covered when not in use with the aid of the charging flap 2. A charging plug 4 shown in FIG. 1 can be plugged into the charging socket 3.

The charging plug 4 is part of a charging infrastructure (not specified in detail), with the aid of which the motor vehicle, which in the embodiment is designed as an electric or hybrid vehicle, or its rechargeable batteries are supplied with the required electrical energy. For this purpose, it is necessary for the charging plug 4 to be completely plugged into the charging socket 3, as indicated in FIG. 1. Only then can the current required for charging the batteries flow. Beforehand, it is usually necessary for a user to have registered with a charging station as part of the charging infrastructure in order to also ensure the required payment for the electric current.

As soon as the charging plug 4 is completely plugged into the charging socket 3 and the required charging current can flow, this state is fixed by locking the charging plug 4 in relation to the charging socket 3. For this purpose, a locking drive 5 for a locking element 6 is implemented.

On the basis of an action upon the locking drive 5, the locking element 6, with the aid of the locking drive 5, is configured either for releasably locking the charging plug 4 in relation to the charging socket 5 or for acting upon a further element. In the context of the invention and according to the embodiment, the further element is the charging flap 2 covering the charging socket 3.

It can be seen from the illustration in FIG. 1 that the locking drive 5 according to the embodiment and purely schematically consists of substantially two elements, namely an electric motor 5*a* and a drive wheel 5*b*. The electric motor 5*a* causes the drive wheel 5*b* to rotate. A spindle 6, which, according to the embodiment, represents the locking element 6 or is connected thereto, engages in the drive wheel 5*b*. For this purpose, the drive wheel 5*b* centrally has a corresponding internal thread and the spindle 6 or the locking element 6 is equipped with a corresponding external thread in the region of engagement with the drive wheel 5*b*.

The electric motor 5*a* causes the drive wheel 5*b* to rotate. Depending on the direction of rotation of these rotations of the drive wheel 5*b*, this corresponds to a movement of the spindle 6 or the locking element 6 to the right or left, as indicated in FIG. 1 by a double arrow. As a result, the locking element 6 can extend and retract in relation to a housing 7 accommodating the locking drive 5, on both sides and on opposite sides.

In this way, the charging flap 2 can be locked and unlocked by means of the locking element 6. In FIG. 1, the unlocked state of the charging flap 2 is shown in solid lines. In this unlocked state, the charging flap 2 can be opened and the charging socket 3 is accessible, so that the charging plug 4 can be plugged into the charging socket 3 in this state. However, if the charging flap 2 is in its locked state shown in dash-dotted lines in FIG. 1, the charging socket 3 is covered and the charging plug 4 cannot be plugged into the charging socket 3.

As already explained, the locking drive 5 is a linear drive for the locking element 6. The linear drive is specifically designed as a spindle/spindle nut drive. The locking element 6 also functions as a spindle and the drive wheel 5*b* assumes the function of the spindle nut. In this way, the design is such that the locking element 6 passes through the locking drive 5 on both sides or can be extended and retracted on both sides from the housing 7 surrounding the locking drive 5.

According to the embodiment, the locking element 6 is designed as a locking pin. The locking pin has a design at its plug-side end 6*a* that is adapted to a recess 4*a* in the charging plug 4 that accommodates the plug-side end 6*a* of the locking pin. The plug-side end 6*a* of the locking pin or the locking element 6 can only engage in the said recess 4*a* of the charging plug 4 when the charging plug 4 assumes its securely plugged-in position inside the charging socket 3. The locking element 6 or the locking pin additionally passes through an opening 3*a* in an outer wall of the charging socket 3. Only when said opening 3*a* in the charging socket 3 and the recess 4*a* in the charging plug 4, when said charging plug is plugged into the charging socket 3, are aligned with one another can the plug-side end 6*a* of the locking pin pass through the opening 3*a* and dip into the recess 4*a* in the charging plug 4 in order to lock it in relation to the charging socket 3 when it is plugged into the charging socket 3.

The locking element 6 or the locking pin implemented at this point has a further feature at its end opposite the plug-side end 6*a*, the flap-side end 6*b*, which feature is designed for engaging in a recess 2*a* of the charging flap 2. For this purpose, the recess 2*a* in the charging flap 2 may be formed on a locking bar 2*b* connected to the charging flap 2. For this purpose, the locking bar 2*b* can be connected to the inside of the charging flap 2. In principle, however, it is also possible for the charging flap 2 to be designed with a latching lug which forms a releasable latching connection with the flap-side end 6*b* of the locking pin.

The mode of operation is as follows. If the charging flap 2 is unlocked, it can be opened and pivoted open in relation to the motor vehicle body 1. The charging socket 3 is thereby accessible, so that the charging plug 4 can be plugged into the charging socket 3 and locked therein. During this entire process, the locking element 6 is in a neutral position, in which neither the plug-side end 6*a* nor the flap-side end 6*b* have any effect.

If the charging plug 4 is now completely plugged into the charging socket 3, the locking drive 5 ensures that the locking element 6 or the locking pin is moved to the right from the neutral position. As a result, the plug-side end 6*a* of the locking pin passes through the opening 3*a* in the charging socket 3 and dips into the recess 4*a* of the charging plug 4 plugged into the charging socket 3. In this way, the charging plug 4 is locked in its plugged-in position in relation to the charging socket 3.

Once the charging process has ended and the charging plug 4 can be pulled out, the locking element 6 must be moved back to the left into its neutral position. This frees the charging plug 4 from the charging socket 3 and allows the charging plug 4 to be pulled out of the charging socket 3. At the same time, the charging flap 2 can then be closed. According to the embodiment, this corresponds to the transition of the charging flap 2 from its folded-down and solid position into the folded, dash-dotted position.

As soon as the charging flap 2 has assumed its closed, dash-dotted position in relation to the motor vehicle body 1, the locking drive 5 ensures that the locking element 6 is now moved to the left from its neutral position. This results in engagement between the flap-side end 6*b* of the locking pin or locking element 6 with the recess 2*a* in the locking bar 2*b* on the charging flap 2. The charging flap 2 is thereby locked in relation to the motor vehicle body 1. This state is maintained until the charging process described above is to be initiated.

The locking drive 5 is connected as a whole to a control unit (not shown). In accordance with signals from the control unit, this ensures that the locking drive 5 moves the locking element 6 into its neutral position or the position locking the charging plug 4 or, alternatively, into the position locking the charging flap 2. This depends on which function is currently desired.

LIST OF REFERENCE NUMBERS

Body 1
Charging flap 2
Recess 2*a*
Locking bar 2*b*
Charging socket 3
Opening 3*a*
Charging plug 4
Recess 4*a*
Locking drive 5
Electric motor 5*a*
Drive wheel 5*b*
Locking element 6
Spindle 6
End 6*a, b*
Housing 7

The invention claimed is:

1. An electric charging device for a motor vehicle comprising:
- a charging socket that is configured for connection to a charging plug,
- a locking drive, wherein the locking drive is a linear drive for operating on the locking element, and
- a locking element that is acted upon by the locking drive, wherein on basis of an action by the locking drive, the locking element is linearly moved in a first direction in a first operation to releasably lock the charging plug in relation to the charging socket and is linearly moved in a second direction in a second operation to act upon a further element,
- wherein the further element is configured as a charging flap covering the charging socket.

2. The electric charging device according to claim 1, wherein the charging flap is acted upon for locking or unlocking by the locking element.

3. The electric charging device according to claim 1, wherein the linear drive is a spindle/spindle nut drive that operates to extend or retract the locking element.

4. The electric charging device according to claim 3, wherein the linear drive includes a drive wheel through which the spindle passes.

5. The electric charging device according to claim 4, wherein the spindle comprises the locking element and the spindle nut comprises the drive wheel.

6. The electric charging device according to claim 1, wherein the locking element passes through the locking drive on both sides.

7. The electric charging device according to claim 1, wherein the locking element is a locking pin.

8. The electric charging device according to claim 1, wherein the locking element is configured at a plug-side end for engaging in a recess of the charging plug when plugged into the charging socket for performing the first operation of locking the charging plug in relation to the charging socket.

9. The electric charging device according to claim 8, wherein the locking element is configured at a flap-side end opposite from the plug-side end for engaging in a recess of the charging flap for performing the second operation of acting upon the charging flap.

10. The electric charging device according to claim 9, further comprising a latching lug connected to the charging flap, wherein the recess is provided in or on the latching lug.

11. The electric charging device according to claim 9, further comprising a latching lug connected to the charging flap, wherein the recess is provided in or on the latching lug.

12. The electric charging device according to claim 1, wherein when the locking element is performing the first operation of locking the charging plug in relation to the charging socket the charging flap is open, and when the charging plug is disengaged from the charging socket the locking element performs the second operation to lock the charging flap.

13. The electric charging device according to claim 1, wherein the locking element is movable by the drive between a neutral position in which nether the first operation nor the second operation is being performed, a first position for performing the first operation of locking the charging plug in relation to the charging socket, and a second position for performing the second operation of acting on the charging flap.

14. The electric charging device according to claim 13, wherein the locking element is moved by the drive in opposite directions from the neutral position to the first position relative to the second position.

15. The electric charging device according to claim 1, wherein the charging flap includes a locking bar that has a recess for engagement by the locking element for performing the second operation.

16. An electric charging device for a motor vehicle comprising:

a charging socket that is configured for connection to a charging plug, a locking drive, and a locking element that is acted upon by the locking drive, wherein on basis of an action by the locking drive, the locking element is configured to perform one of either a first operation comprising releasably locking the charging plug in relation to the charging socket or a second operation comprising acting upon a further element, wherein the further element is configured as a charging flap covering the charging socket, wherein the locking element is configured at a plug-side end for engaging in a recess of the charging plug when plugged into the charging socket for performing the first operation of locking the charging plug in relation to the charging socket, and wherein the locking element is configured at a flap-side end opposite from the plug-side end for engaging in a recess of the charging flap for performing the second operation of acting upon the charging flap.

17. An electric charging device for a motor vehicle comprising:

a charging socket that is configured for connection to a charging plug, a locking drive, and a locking element that is acted upon by the locking drive, wherein on basis of an action by the locking drive, the locking element is configured to perform one of either a first operation comprising releasably locking the charging plug in relation to the charging socket or a second operation comprising acting upon a further element, wherein the further element is configured as a charging flap covering the charging socket, and wherein the charging flap includes a locking bar that has a recess for engagement by the locking element for performing the second operation.

* * * * *